Oct. 28, 1947.  A. A. ARNHYM  2,429,739
LOW AND HIGH FIRE CONTROL FOR LIQUID FUEL BURNERS
Original Filed Nov. 6, 1944

INVENTOR.
Albert A. Arnhym
BY
E. L. Woodbury
ATTORNEY.

Patented Oct. 28, 1947

2,429,739

UNITED STATES PATENT OFFICE 2,429,739

LOW AND HIGH FIRE CONTROL FOR LIQUID FUEL BURNERS

Albert A. Arnhym, San Diego, Calif., assignor to Solar Aircraft Company, San Diego, Calif., a corporation of California Original application November 6, 1944, Serial No. 562,236. Divided and this application December 4, 1945, Serial No. 632,773

2 Claims. (Cl. 158—28)

This invention relates to heaters utilizing liquid fuel, such as alcohol.

This application is a division of my copending application Serial No. 562,236, filed November 6, 1944, and entitled "Heater."

An object of the invention is to provide a rugged, reliable and efficient portable heater.

Another object is to provide an alcohol heater than can be quickly started and stopped and is largely automatic in operation.

Other specific objects and features of the invention will become apparent from the detailed description to follow of a particular embodiment of the invention.

Essentially, the heater of the present invention consists of a self-contained unit of generally cylindrical dimensions containing a combustion chamber, a built-in fuel tank and fuel control devices for making the heater largely automatic in operation. The combustion chamber comprises a vertical chamber that is open at the top and closed at the bottom and contains an upwardly extending re-entrant tube having air apertures in its side walls for delivering combustion air. The fuel is introduced into the bottom of the combustion chamber and ignited at the point of introduction. During periods when little or no heat is required, only a small amount of fuel is admitted which burns with a small flame at the point of introduction and maintains a thermocouple heated, the thermocouple supplying current for the control of magnetic valves in the fuel line.

Preferably there are two valves connected in parallel in the fuel line, one of which is maintained open whenever the thermocouple is energized and passes a small stream of fuel sufficient only to maintain the pilot flame. The other magnetic valve may be connected to a control switch or a thermostatic switch so that it is open only when the switch is closed. This second valve admits a larger stream of fuel which overflows into the bottom part of the combustion chamber and produces a flame which more or less fills the chamber.

A particular feature of the invention is the use of a standpipe in the fuel line between the elecromagnetic valves and a master manual valve, which standpipe is normally filled with fuel so that when the master valve is opened to start the heater, a substantial quantity of fuel flows from the standpipe into the bottom of the combustion chamber to immediately generate sufficient heat to energize the thermocouple and cause it to open one or both of the electromagnetic valves.

Referring now to the drawing.

Figure 1:
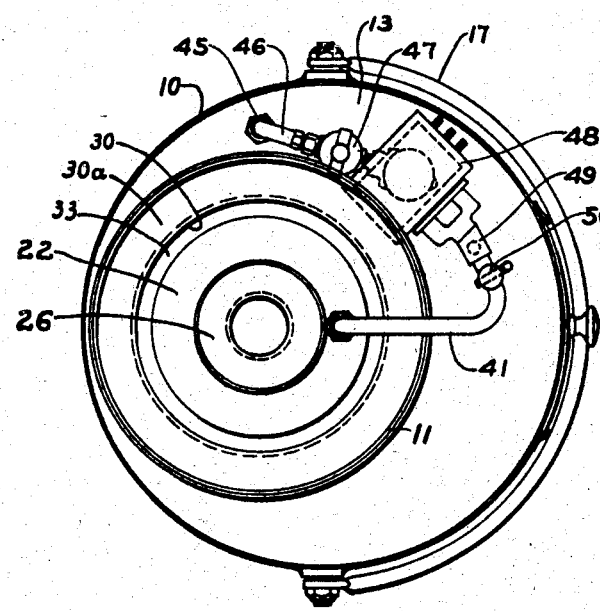
Fig. 1 is a view looking into the bottom of a heater in accordance with the invention.
Figure 2:
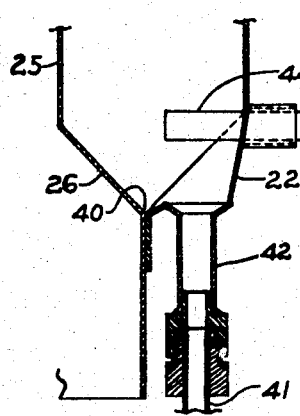
Fig. 2 is a detail view of the fuel inlet to the combustion chamber.

Referring to the drawing, the heater therein depicted comprises an outer cylindrical wall 10 of sheet metal and an inner generally cylindrical wall 11 positioned within the wall 10 and offset with respect to the axis of the latter. The inner wall 11 has a slight taper, being smaller at the top than at the bottom for a purpose to be explained later.

An intermediate horizontal partition wall 13 is also provided between the walls 10 and 11 and secured to them in fluid-tight relation to define a fuel reservoir 14. The space below the partition wall 13 and exterior of the wall 11 is largely empty except for the fuel supply and control equipment which will be described later. A bail 17 may be secured to the outer wall 10 for convenience in handling.

The combustion chamber of the heater is positioned within and thermally insulated from the wall 11. Thus an inner wall 20 defines the combustion chamber proper. It is of generally cylindrical shape but the upper section thereof is of somewhat smaller diameter than the lower section, there being a throat portion 21 of conical shape interconnecting the larger diameter lower portion with the upper small diameter portion.

At the lower end the wall 20 is flared inwardly at an angle as indicated at 22 and joined as by welding to the lower end of an air supply tube 23, the latter having a lower end portion 24 of substantially the same diameter as the neck of the inwardly flared portion 22 of the wall 20 but having an upper portion 25 of substantially smaller diameter. The large and small sections of the air tube 23 are interconnected by a conical portion 26 which is juxtaposed to the section 22 of wall 20 and forms therewith an annular trough for the reception of fuel. The upper small section 25 of the air tube 23 is provided near its midportion with a plurality of air openings 27 which may be arranged in four vertical rows equally spaced circumferentially. A single annular row of smaller holes 28 is preferably provided near the upper end of the air tube 23 which is located approximately at the upper end of the transition zone 21 of the wall 20.

Surrounding the wall 20 in uniform spaced relation with respect thereto is a wall 30 also preferably of metal and the wall 20 is supported from the wall 30 by a plurality of brackets 31, these brackets also serving to maintain the proper spaced relation between walls 20 and 30. The wall 30 has an outwardly flared portion 30a at its lower end which is connected by a bracket 32 to the wall 10, this bracket serving to support the wall 30 and everything therewithin in proper vertical position with respect to the wall 11.

In operation, as will be described later, there is quite a rapid flow of air upwardly through the annular passage 33 between the walls 20 and 30 which maintains the wall 30 at a substantially lower temperature than the wall 20. However, to maintain the inner wall 11 of the fuel tank 14 at a sufficiently low temperature, thermal insulation is provided between the walls 30 and 11. This insulation may consist of an inner layer 35 of some fire-resistant thermal insulating material, such as asbestos, and an outer layer 36 of some material, such as rock wool having a higher insulating efficiency than the inner wall 35. The use of a different material for insulation 36 is permissible because of the fact that it is not exposed to as high temperatures as is the layer 35.

Fuel is introduced into the annular trough 40 defined by the flared walls 22 and 26 through a fuel pipe 41 which connects to a pilot tube 42 of somewhat larger diameter. The upper end of the pilot tube 42 extends through the wall 22 in a fluid-tight relation with respect thereto. A thermocouple 44 is mounted on the wall 20 with its inner end projecting through the wall into position immediately above the pilot tube 42 so that it is heated by the pilot flame.

Referring to the bottom view of Fig. 1, fuel flows from the bottom of the tank through a fitting 45 and a tube 46 and through a filter 47 into a control unit 48, and from the latter through a tube 49 and a cock 50 to the tube 41.

The control unit 48 contains a float bowl and a pair of electromagnetic valves. Referring to the schematic diagram of Fig. 3, the float bowl 51 is indicated as containing a float 52 actuating a needle valve 53 through which fuel enters from the filter 47. The float valve maintains a constant level of fuel in the float bowl 51 irrespective of the height of the fuel in the main tank 14.

From the bottom of the float bowl 52, fuel flows into a chamber 54, from which it can escape only through one or both of the tubes 55 and 56. Flow into the tube 55 is controlled by an electromagnetic valve 57 and flow into tube 56 is controlled by an electromagnetic valve 58.

Figure 3:
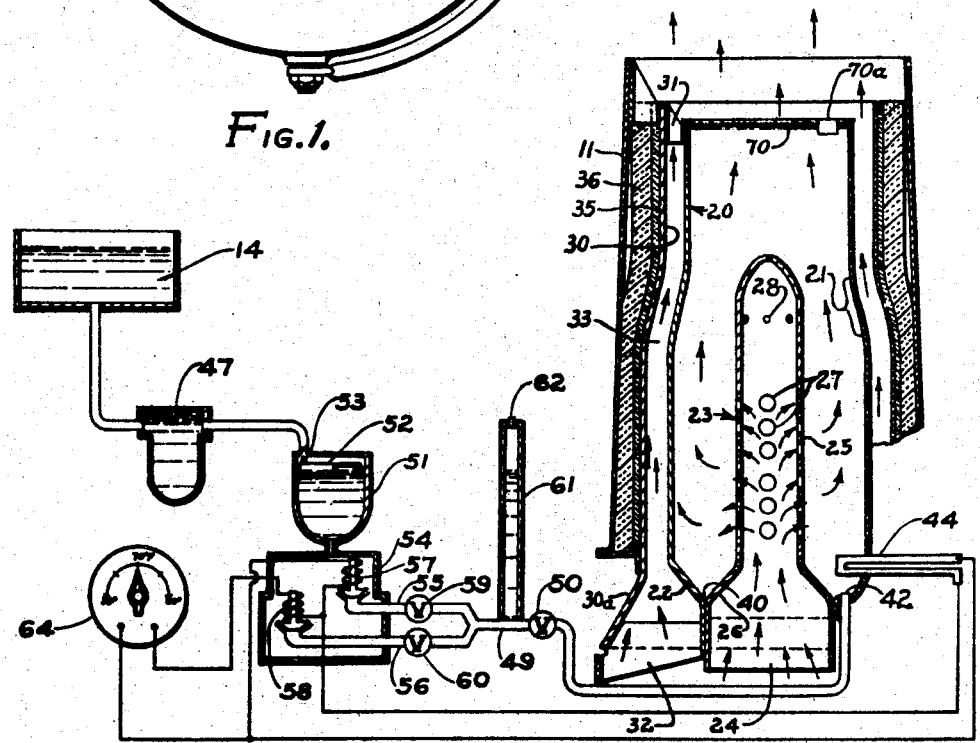
Fig. 3 is a schematic diagram illustrating the operation of the heater.

As shown in Fig. 3, auxiliary manual valves 59 and 60 are shown in the tubes 55 and 56, respectively, for controlling the rate of flow through those tubes when the electromagnetic valves are open. However, these valves 59 and 60 might be replaced by fixed flow orifices, if desired.

The two tubes 55 and 56 merge into the single tube 49 which has connected thereto a standpipe 61 having a small vent aperture 62 in its upper end. Fuel flows from the tube 49 through the cock 50, when the latter is open, and through the tube 41 to the pilot tube 42.

The electromagnetic valves 57 and 58 are actuated by current from the thermocouple 44. Valve 57 is permanently connected to the thermocouple so that it is open so long as the thermocouple is heated, and it controls the flow of fuel to maintain the pilot flame when no heat is desired. The other electromagnetic valve 58 admits a larger quantity of fuel to the burner when heat is desired, and it is connected to the thermocouple 44 in series with a thermostatic switch 64, although a manual control switch can be used if desired. When a thermostatic switch is employed, it is preferably mounted in the coolest part of the device so that it will be responsive to the temperature of the air entering the heater and will be relatively non-responsive to the heat generated in the combustion chamber.

The device operates as follows. Let it be assumed that the device has been completely shut down, under which condition the cock 50 is closed and all flow of fuel to the combustion chamber is stopped so that the thermocouple 44 is cold. Operation is started by opening the valve 50.

For reasons that will be explained later, the standpipe 61 will be filled with fuel to the level of the liquid in the float bowl 51 prior to opening of the valve 50 so that immediately following opening of the valve, the fuel in the standpipe drains quickly into the annular trough 40 in the bottom of the combustion chamber and may be ignited with a match. The fire screen 70 may have a hole 70a through which a match may be entered on a holder. Alternatively, a lighter of the flint and steel variety may be built into the heater, if desired.

As previously indicated, the fuel is preferably alcohol which ignites readily and quickly warms the walls of the combustion chamber and the inner end of the thermocouple 44. The dimensions of the standpipe 61 are so chosen that the amount of fuel initially supplied from the standpipe is sufficient to heat the thermocouple 44 to a point where it generates sufficient current to open the magnetic relays 57 and 58. Fuel thereupon flows immediately through the pipe 55 in a small quantity sufficient to maintain a pilot flame at the inlet tube 42 immediately under the thermocouple 44. Of course, some of the fuel flows back into the standpipe 61 to raise the level therein slightly, but when the valve 50 is open, the resistance to flow in the line between the standpipe and the inlet tube 42 is relatively small so that the level of the liquid in the standpipe will not rise much above the level of the inlet tube 42. So long as fuel is supplied only through the pipe 55, it does not escape from the inlet tube 42 but vaporizes within the tube and burns with a flame immediately thereabove to heat the thermocouple 44. The height of the liquid is automatically regulated since if it tends to rise in the inlet tube 42, it is heated more by the flame and evaporated faster so that the level drops until a position of equilibrium is reached.

If the thermostatic switch 64 or a manual switch in place thereof is closed, the circuit will also be completed for opening the magnetic valve 58 to permit a larger quantity of fuel to flow through the pipe 56. In addition to the flow through the pipe 55, the quantity supplied when the valve 58 is open is usually sufficient to overflow the inlet tube 42 into the trough 50 where it is rapidly vaporized and burned.

The main flow of fuel through tube 56 can be interrupted by the action of the switch 64 which deenergizes and closes the valve 58 without interrupting the small flow of fuel through pipe 55 to maintain a pilot flame. The pilot flame in turn maintains the thermocouple 44 energized so that the magnetic valve 57 is held open and the magnetic valve 58 is opened whenever the switch 64 closes.

When it is desired to shut the heater down completely, the valve 50 is again closed. This immediately stops all flow of fuel to the combustion chamber and the flame therein is soon extinguished. Immediately upon closure of the valve 50, the fuel flowing through pipe 55 or through pipes 55 and 56 enters the standpipe 61 up to the level of the liquid in the float bowl 51. This occurs before the thermocouple 44 cools off enough to de-energize the valves 57 and 58. The liquid remains in the standpipe 61 ready to charge the combustion chamber and start the operation the next time the valve 50 is opened.

A heater in accordance with the invention having a fuel capacity of five gallons is capable of supplying 15,000 B. t. u. per hour for approximately twenty-three hours and supplying 10,000 B. t. u. per hour for approximately thirty-four hours. The pilot flame is required to generate approximately 300 B. t. u. per hour in order to insure that the flame will be of sufficient size not to be blown out and to heat the thermocouple to the required temperature.

It is found that the supply of combustion air through the holes 27 and 28 in the central tube 23 provides very complete combustion. Tests indicate that the maximum quantity of carbon monoxide present in the exhaust gases from the heater is approximately 0.002% which is well below the safety limit.

The flared walls at the lower end of the combustion chamber, in addition to defining the annular trough 40, define an enlarged central opening to the tube 25 and an enlarged annular opening leading to the air passage 33. The particularly free flow of air into the tube 23 and out through the holes 27 and 28 therein insures an ample supply of air for complete combustion. The rapid flow of air through the annular passage 33 is highly desirable in that it helps to maintain the outer wall 30 at a low temperature and reduces the temperature of the inner wall of the fuel tank. It also insures the supply of a relatively large amount of moderately heated air from the heater rather than a small amount of more intensely heated air.

In operation, when the main valve 60 is opened, the fuel flows over the top of the pilot tube 42 into the annular trough of the combustion chamber and starts burning on its surface. Shortly thereafter, as the combustion chamber warms up and draft is created in the outer duct 33 and the injection column 23, the jet action previously mentioned is started. Thereafter, the fluid fuel vaporizes more readily, and after the device has been in operation for a short time, the flame leaves the surface of the fuel entirely and combustion commences at the air jets issuing from the orifices 27 and 28, the lower portion of the combustion chamber below the lowest orifice 27 being then filled with vaporized fuel. The rate of vaporization becomes faster as the temperature rises and the pressure within the combustion chamber is reduced. The fuel level in the annular trough then gradually lowers to establish an equilibrium where the rate of vaporization equals the rate of liquid fuel supplied.

Although for the purpose of explaining the invention a specific embodiment thereof has been described in considerable detail, various departures from the exact construction can be made without departing from the invention which is to be limited only to the extent set forth in the appended claims.

I claim:

1. A liquid fuel combustion device comprising: a combustion chamber, the lower portion of which is liquid-tight for the retention of liquid fuel; a fuel supply line entering said combustion chamber; a source of fuel at a head above the bottom of said combustion chamber; first control valve means positioned in said fuel line between said source and said combustion chamber; a standpipe connected to said fuel line between said first valve means and said combustion chamber; a starting valve in said fuel line between said standpipe and said combustion chamber; means for electrically operating said first valve to open it including a thermocouple positioned in said combustion chamber for supplying current to open said first valve, said standpipe being so proportioned as to normally supply enough fuel to said combustion chamber following opening of said second valve to develop sufficient heat to energize said thermocouple and open said first valve.

2. A device as described in claim 1 in which said first valve is dimensioned to supply sufficient fuel to maintain a pilot flame in said combustion chamber; a second electrically actuated valve and a second line from said source to said fuel chamber for supplying a larger quantity of fuel thereto; and circuit means including a separate control switch for connecting said last-mentioned valve to said thermocouple.

ALBERT A. ARNHYM.

REFERENCES CITED

The following references are of record in the file of this patent:

UNITED STATES PATENTS

| Number | Name | Date |
|---|---|---|
| 1,023,968 | Sharp | Apr. 23, 1912 |
| 1,892,761 | Celander | Jan. 3, 1933 |
| 2,017,238 | Finley | Oct. 15, 1935 |
| 2,225,203 | Barnes | Dec. 17, 1940 |
| 2,290,544 | DeLancey | July 21, 1942 |
| 2,347,268 | Kessler | Apr. 25, 1944 |
| 1,727,744 | Bulkley | Sept. 10, 1929 |
| 2,241,327 | Selby | May 6, 1941 |
| 2,319,708 | Smith et al. | May 18, 1943 |
| 2,355,436 | Hayter | Aug. 8, 1944 |
| 668,587 | Smith | Feb. 19, 1901 |
| 511,555 | Streator | Dec. 26, 1893 |
| 2,101,424 | Bennet | Dec. 7, 1937 |
| 1,834,287 | McCabe | Dec. 1, 1931 |